US008818379B2

(12) United States Patent
Aaron (10) Patent No.: US 8,818,379 B2
(45) Date of Patent: Aug. 26, 2014

(54) METHODS, SYSTEMS, AND COMPUTER-READABLE MEDIA FOR PROVIDING MULTIPLE COMMUNICATION PATHS

(75) Inventor: Jeffrey A. Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1776 days.

(21) Appl. No.: 11/863,787

(22) Filed: Sep. 28, 2007

(65) Prior Publication Data

US 2009/0088169 A1 Apr. 2, 2009

(51) Int. Cl.
*H04W 36/32* (2009.01)

(52) U.S. Cl.
USPC ........... 455/440; 455/436; 455/437; 455/441; 370/331; 370/332

(58) Field of Classification Search
CPC ................................ H04W 36/00; H04W 4/00
USPC .......... 455/445, 437, 440, 441, 436; 370/332, 370/331
See application file for complete search history.

(56) References Cited

U.S. PATENT DOCUMENTS

| | | | |
|---|---|---|---|
| 6,356,555 B1 * | 3/2002 | Rakib et al. | 370/441 |
| 7,392,045 B2 * | 6/2008 | Ben-Eli | 455/421 |
| 2003/0223400 A1 * | 12/2003 | Knisely et al. | 370/346 |
| 2004/0116143 A1 * | 6/2004 | Love et al. | 455/522 |
| 2007/0149201 A1 * | 6/2007 | Dominique et al. | 455/442 |
| 2007/0249315 A1 * | 10/2007 | Sorensen et al. | 455/298 |
| 2009/0239536 A1 * | 9/2009 | Fallgren et al. | 455/436 |

* cited by examiner

*Primary Examiner* — Patrick Edouard
*Assistant Examiner* — Michael Irace
(74) *Attorney, Agent, or Firm* — Hartman & Citrin LLC

(57) ABSTRACT

Methods, systems, and computer-readable media provide for providing multiple communication paths. According to embodiments, a method for providing multiple communication paths is provided. According to the method, a plurality of cellular towers within a given range from a cellular device is determined. A first quality rating is determined for each of the plurality of cellular towers. A first group of cellular towers is selected from the plurality of cellular towers based on the first quality rating. A first plurality of communication paths is established between the cellular device and the first group of cellular towers. Each of the first plurality of communication paths may correspond to one of the cellular towers in the first group. At least one quality factor associated with each of the first plurality of communication paths is adjusted based on the first quality rating.

14 Claims, 4 Drawing Sheets

Fig. 2

Fig. 3 though the drawings are shown by way of illustration
METHODS, SYSTEMS, AND COMPUTER-READABLE MEDIA FOR PROVIDING MULTIPLE COMMUNICATION PATHS

TECHNICAL FIELD

This application relates generally to the field of quality of service. More specifically, the disclosure provided herein relates to the field of cellular-related quality of service.

BACKGROUND

Cellular-related quality of service ("QoS") issues are a significant source of frustration for service providers as well as their customers. Common QoS issues include bandwidth limitations, jitter, delay and latency, packet loss, and interference. QoS issues may result in a number of problems for customers, potentially causing customers to change service providers. In one example, a customer may experience a "dropped call," in which a phone call unexpectedly ends. In another example, a customer may experience a slow data transfer rate that is not suitable for transferring high-bandwidth content, such as video and music. In yet another example, a customer may experience unacceptable quality of service, causing customer dissatisfaction ranging from annoyance to anger.

A cellular device, such as a cellular phone, typically utilizes a single radio frequency ("RF") signal path for incoming and outgoing communications. Uncontrollable variations in the RF signal path may affect the available bandwidth and other factors which determine service quality. Further, when the RF signal path is lost, any ongoing communications may be terminated. This may result in dropped calls and other QoS-related problems.

SUMMARY

Embodiments of the disclosure presented herein include methods, systems, and computer-readable media for providing multiple communication paths. According to one aspect, a method for providing multiple communication paths is provided. According to the method, a plurality of cellular towers within a given range from a cellular device is determined. A first quality rating is determined for each of the plurality of cellular towers. A first group of cellular towers is selected from the plurality of cellular towers based on the first quality rating. A first plurality of communication paths is established between the cellular device and the first group of cellular towers. Each of the first plurality of communication paths may correspond to one of the cellular towers in the first group. At least one quality factor associated with each of the first plurality of communication paths is adjusted based on the first quality rating.

According to another aspect, a system for providing multiple communication paths is provided. The system includes a memory and a processor functionally coupled to the memory. The memory stores a program containing code for providing multiple communication paths. The processor is responsive to computer-executable instructions contained in the program and operative to determine a plurality of cellular towers within a given range from a cellular device, determine a first quality rating for each of the plurality of cellular towers, select a first group of cellular towers from the plurality of cellular towers based on the first quality rating, establish a first plurality of communication paths between the cellular device and the first group of cellular towers, and adjust at least one quality factor associated with each of the first plurality of communication paths based on the first quality rating. Each of the first plurality of communication paths may correspond to one of the cellular towers in the first group.

According to yet another aspect, a computer-readable medium having instructions stored thereon for execution by a processor to perform a method for providing multiple communication paths is provided. According to the method, a plurality of cellular towers within a given range from a cellular device is determined. A first quality rating is determined for each of the plurality of cellular towers. A first group of cellular towers is selected from the plurality of cellular towers based on the first quality rating. A first plurality of communication paths is established between the cellular device and the first group of cellular towers. Each of the first plurality of communication paths may correspond to one of the cellular towers in the first group. At least one quality factor associated with each of the first plurality of communication paths is adjusted based on the first quality rating.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for providing multiple communication paths. In the following detailed description, references are made to the accompanying drawings that form a part hereof, and which are shown by way of illustration through specific embodiments or examples.

Embodiments described herein provide for multiple communication paths (also referred to herein as links), each of which enables communication between a cellular device (e.g., a cellular phone, smartphone, personal digital assistant ("PDA")) and one of a plurality of cellular towers. The multiple links may provide additional flexibility in communicating the desired data over the single link utilized in conventional communications networks. To utilize this additional flexibility, data may be multiplexed (i.e., split) into data segments, and the data segments may be transmitted across the plurality of links. In one embodiment, different links have different bandwidths in accordance with the quality of each of the links. While the total aggregate bandwidth used over the multiple links to communicate the desired data may be the same as the bandwidth required to communicate that data over a single link, the additional flexibility provided by the multiple links allows that bandwidth to be split between the multiple links in any fashion.

The multiple links may further transmit redundant data (i.e., duplicates of the transmitted data). In this case, the total aggregate bandwidth used over the multiple links to communicate the desired data would be greater than the bandwidth required to communicate that data over a single link, with the increased bandwidth reflecting the amount of redundant data added. The redundant data may serve as insurance in case original data is lost during transmission across the links. In particular, the redundant data may be used to replace lost original data. For example, if an original data segment is corrupted or lost during transmission across one link, a redundant data segment (i.e., a duplicate of the original data segment) that is successfully transmitted across another link may be used to replace the lost original data segment. The multiple links and the redundant data may be managed in an intelligent way such that excessive bandwidth usage and unnecessary computations are minimized. In particular, the added computations necessary to split and combine the data with respect to the multiple links can be minimized by various methods, for instance by attempting to utilize the minimum number of multiple links and/or the minimum amount of redundant data needed to achieve acceptable thresholds of QoS.

The multiple links may further transmit error detection and correction ("EDAC") code in addition to the original data and the redundant data. In this case, the total aggregate bandwidth used over the multiple links to communicate the desired data would be greater than the bandwidth required to communicate that data over a single link, with the increased bandwidth reflecting the amount of additional EDAC-specific data added to the original data. The EDAC code may enable the automatic detection and correction of errors in the original data when received. In particular, any errors in the original data may be corrected by replacing missing or corrupted portions of the original data with the equivalent portions of the redundant data. It should be appreciated that a number of EDAC methods are well known in the art including, for example, Hamming codes, Reed-Solomon codes, and Viterbi algorithm approaches. The EDAC mechanisms may be managed in an intelligent way such that excessive bandwidth usage and unnecessary computations are minimized. The added computations necessary to apply and decode EDAC coding with respect to the multiple links can be minimized by attempting to utilize the minimum EDAC needed to achieve acceptable thresholds of QoS.

When a user initially uses the cellular device, a plurality of links may be established between the cellular device and the plurality of cellular towers. Each link generally corresponds to one of the cellular towers. As described in greater detail below with respect to FIGS. 1A, 1B, 2, and 3, a number of quality factors associated with each link may be adjusted in accordance with a quality rating associated with each cellular tower. This may be known as a soft adaptation. The quality rating may also determine whether a new link to a new cellular tower is created and whether an existing link to another cellular tower is terminated. This may be known as a hard adaptation.

A number of currently available cellular devices include multiple receivers (sometimes termed "fingers") that may be used for enabling the multiple paths. Other techniques for enabling the multiple paths may also be used. For example, if multiple receivers and/or transmitters are not available, a time slot may be introduced for each of the multiple paths, and each time slot may be quickly switched using, for example, time-division multiple access ("TDMA"). As another example, if multiple receivers and/or transmitters are not available, a different frequency may be introduced for each of the multiple paths, and each frequency may be quickly switched using, for example, frequency-division multiple access ("FDMA"). Further, different code-division multiple access ("CDMA") codes or other codes may be used for each of the multiple paths. Since the switching may occur at a speed faster than a user can perceive, this switching technique may achieve a near equivalent and a practical alternative to a true multiple receiver configuration. Embodiments described herein may utilize fingers, switching, TDMA, FDMA, CDMA, combinations thereof, and other suitable techniques for enabling multiple paths.

Figure 1A:
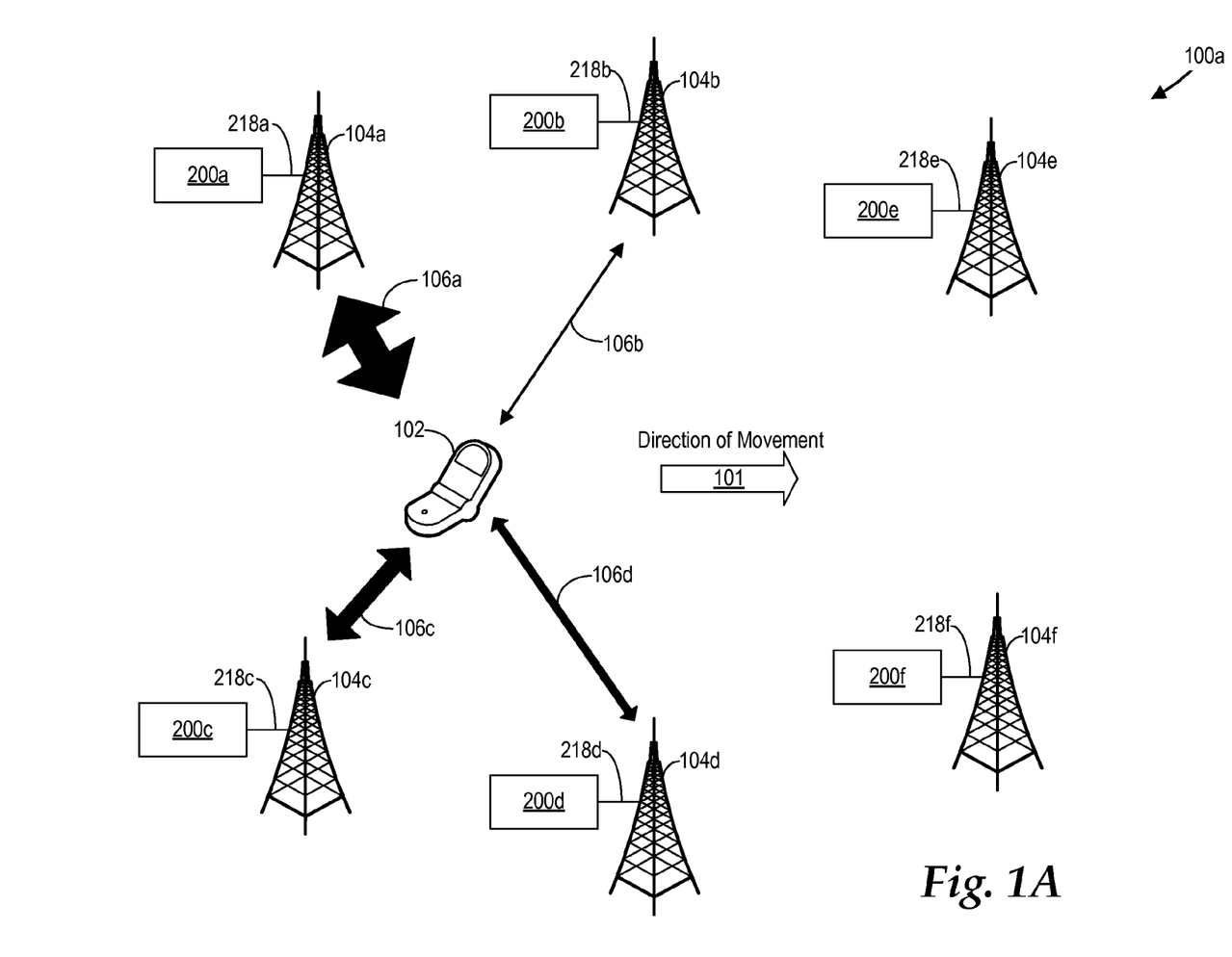
FIG. 1A is a high-level diagram illustrating an exemplary communications network including a cellular device and a plurality of cellular towers prior to a movement of the cellular device.

Referring now to the drawings, it is to be understood that like numerals represent like elements through the several figures, and that not all components and/or steps described and illustrated with reference to the figures are required for all embodiments. FIG. 1A is a high-level diagram illustrating an exemplary communications network 100a including a cellular device 102 and a plurality of cellular towers 104a, 104b, 104c, 104d, 104e, 104f prior to a movement of the cellular device 102 in a direction shown at 101. The plurality of cellular towers 104a, 104b, 104c, 104d, 104e, 104f include the first cellular tower 104a, the second cellular tower 104b, the third cellular tower 104c, the fourth cellular tower 104d, the fifth cellular tower 104e, and the sixth cellular tower 104f. The communications network 100a further includes a plurality of links 106a, 106b, 106c, 106d between the cellular device 102 and the cellular towers 104a, 104b, 104c, 104d. In particular, the cellular device 102 may communicate with the first cellular tower 104a via the first link 106a. The cellular device 102 may communicate with the second cellular tower 104b via the second link 106b. The cellular device 102 may communicate with the third cellular tower 104c via the third link 106c. The cellular device 102 may communicate with the fourth cellular tower 104d via the fourth link 106d. Further, as described in greater detail below with respect to FIG. 2, each of the cellular towers 104a, 104b, 104c, 104d, 104e, 104f is operatively coupled to one of a plurality of systems 200a, 200b, 200c, 200d, 200e, 200f via respective networks 218a, 218b, 218c, 218d, 218e, 218f.

As described in greater detail below, the links 106a, 106b, 106c, 106d may transmit original data, redundant data, EDAC codes, and any other signals and/or data transmittable between a cellular tower and a cellular device. The original data may include any suitable communications data, such as voice, pictures, video, and text, transmitted during the ordinary operation of the cellular device 102. As used herein, the redundant data refers to duplicates of the original data. The EDAC codes may include any suitable codes for automatically detecting and correcting errors in the original data. In some cases, the EDAC codes may introduce additional EDAC-specific data, such as data related to but different than the original data as well as some redundant data.

In one embodiment, a first quality rating is determined for each connection between the cellular device 102 and the cellular towers 104a, 104b, 104c, 104d, 104e, 104f. The first quality rating may be based on a signal-to-noise ratio associated with the connections between the cellular device 102 and the cellular towers 104a, 104b, 104c, 104d, 104e, 104f as well as the consistency and volatility of the connections. In further embodiments, the first quality rating is based on any suitable QoS-related indicators associated with the connections between the cellular device 102 and the cellular towers 104a, 104b, 104c, 104d, 104e, 104f. Examples of QoS-related indicators include jitter, delay, latency, data loss, and interference.

A first group of the cellular towers 104a, 104b, 104c, 104d may be selected based on the first quality rating associated with each of the cellular towers 104a, 104b, 104c, 104d, 104e, 104f. In particular, the first group of the cellular towers 104a, 104b, 104c, 104d may include the cellular towers associated with the highest first quality rating. The links 106a, 106b, 106c, 106d may be established between the cellular device 102 and the first group of cellular towers 104a, 104b, 104c, 104d.

It should be noted that in the embodiment shown in FIG. 1A, no links have been established between the cellular device 102 and the fifth cellular tower 104e or the sixth cellular tower 104f. In one embodiment, the first quality ratings for connections between the cellular device 102 and the cellular towers 104e, 104f are lower than the first quality ratings for connections between the cellular device 102 and the cellular towers 104a, 104b, 104c, 104d. It should further be noted that while four links 106a, 106b, 106c, 106d are established in the embodiment shown in FIG. 1A, the cellular device 102 may include any suitable number of links in accordance with further embodiments.

The first quality rating may affect one or more quality factors associated with the links 106a, 106b, 106c, 106d. In particular the quality factors may be adjusted based on the first quality rating. In one embodiment, the quality factors include a bandwidth factor, a redundancy factor, and an EDAC factor. The EDAC factor may in some cases include both an EDAC type factor as well as an EDAC amount factor. As used herein, the bandwidth factor refers to an amount of bandwidth available on each of the links 106a, 106b, 106c, 106d. The bandwidth factor may determine the amount of original data, redundant data, and EDAC codes that may be transmitted across the links 106a, 106b, 106c, 106d. For example, if the first link 106a has three times greater bandwidth than the third link 106c, then the first link 106a may transmit three packets for every one packet that the third link 106c transmits.

As illustrated in FIG. 1A, the amount of overall data (i.e., the original data, the redundant data, and the EDAC codes) transmitted between the cellular device 102 and the cellular towers 104a, 104b, 104c, 104d is illustrated in accordance with the thickness of the arrows representing the links 106a, 106b, 106c, 106d. For example, the first link 106a may transmit more data than the third link 106c as illustrated by the thicker arrow representing the first link 106a in comparison to the arrow representing the third link 106c. The third link 106c may transmit more data than the fourth link 106d as illustrated by the thicker arrow representing the third link 106c in comparison to the arrow representing the fourth link 106d. The fourth link 106d may transmit more data than the second link 106b as illustrated by the thicker arrow representing the fourth link 106d in comparison to the arrow representing the second link 106b. The amount of data being transmitted between the cellular device 102 and the cellular towers 104a, 104b, 104c, 104d may be affected by a number of factors including, but not limited to, the strength of signals between the cellular device 102 and the cellular towers 104a, 104b, 104c, 104d, the variation in the signal strengths, the signal-to-noise ratios between the cellular device 102 and the cellular towers 104a, 104b, 104c, 104d, the variation in the signal-to-noise ratios, the distances between the cellular device 102 and the cellular towers 104a, 104b, 104c, 104d, the transmit power-limited range of the cellular device 102, the wireless resources allocated to the user and cellular device 102, the capacity of the cellular towers 104a, 104b, 104c, 104d, and combinations thereof. Exemplary wireless resources may include time slots, frequencies, codes such as CDMA codes, and others that are pertinent to the particular wireless link mechanisms and technologies used.

As used herein, the redundancy factor refers to an amount of redundant data transmitted across the links 106a, 106b, 106c, 106d. In one embodiment, the amount of redundant communications data is determined based on an amount of original data to be duplicated (hereinafter referred to as $R_P$) and a number of copies of the duplicated data to be produced (hereinafter referred to as $R_N$). As used herein, the EDAC factor refers to an amount of EDAC codes introduced into the links 106a, 106b, 106c, 106d along with the original data and the redundant data transmitted across the links 106a, 106b, 106c, 106d. The EDAC factor may additionally or alternately refer to a type of EDAC coding used or any other parameter pertinent to a particular EDAC scheme which may affect the degree of EDAC effect, the effort required to accomplish the EDAC, and/or the added bandwidth consumed by the EDAC. The EDAC codes may enable the automatic detection and correction of errors in the original data after transmission across the links 106a, 106b, 106c, 106d. In particular, any errors in the original data may be corrected by replacing lost or corrupted portions of the original data with equivalent portions of the redundant data and/or by reconstructing the lost data using the algorithms associated with the EDAC scheme used.

Referring to FIG. 1A, in an illustrative example, the initial first signal-to-noise ratios for links 106a, 106b, 106c, and 106d may be 60, 10, 30, and 20 decibels ("db"), respectively. The first bandwidths assigned to links 106a, 106b, 106c, and 106d may be 150, 25, 75, and 50 kilobits per second ("kpbs"), respectively. The total aggregate bandwidth summed over all four links, i.e., being used by the cellular device 102, is thus 300 kbps.

Figure 1B:
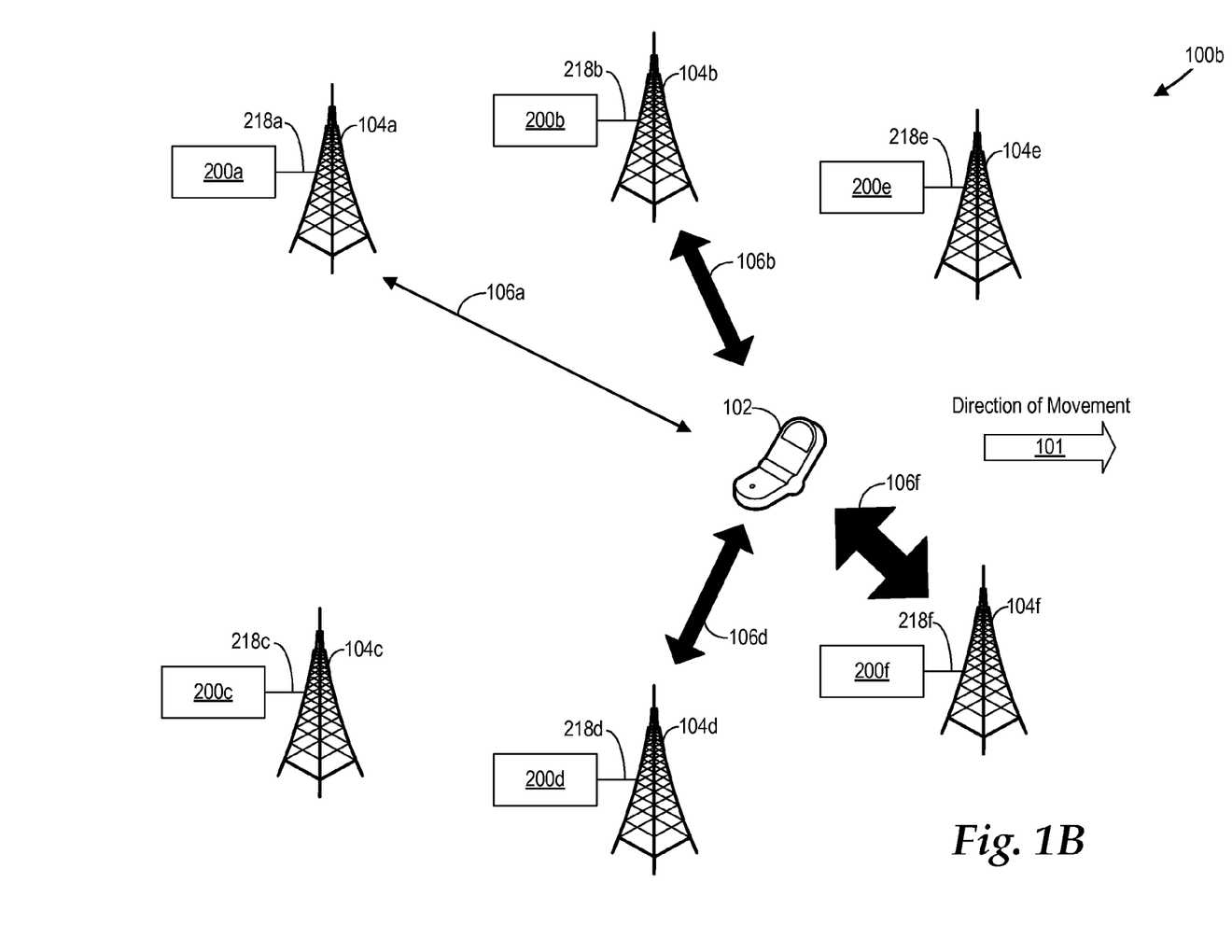
FIG. 1B is a high-level diagram illustrating an exemplary communications network including a cellular device and a plurality of cellular towers after the movement of the cellular device.

After movement of the cellular device 102 as illustrated in FIG. 1B, the signal-to-noise ratios for links 106a, 106b, 106d, and 106f may be 10, 30, 30, and 80 db, respectively. However, data loss may also have increased by, for example, 25 kbps spread over links 106b and 106d. As a result, the bandwidths assigned to links 106a, 106b, 106d, and 106f may be 25, 75, 75, and 150 kbps, respectively, partly reflecting the signal-to-noise ratios, the relationship between available bandwidth and signal-to-noise ratios, and the need to add redundant data to link 106f so as to effectively compensate for the increased data loss.

In this example, the total aggregate bandwidth being used is 325 kbps, which is more than the original by an added 25 kbps, reflecting the 25 kbps data loss experienced due to degraded wireless conditions. In this case, the bandwidth used on each link is the maximum supported by the signal-to-noise ratio for allowing the transmission of an additional 25 kbps of redundant data. If such redundant data were not needed, the bandwidth used on the links could be reduced and made available for use by other mobile devices (not shown).

Alternatively, rather than simply using redundant data alone, a combination of EDAC on links 106b, 106d can be used in combination with a smaller amount of redundant data on link 106f in order to achieve a similar compensation. In this case, perhaps a combination of EDAC on links 106b, 106d can be used with 10 kbps of redundant data added to link 106f, rather than 25 kbps of redundant data. However, the use of EDAC may result in more difficult computation than the use of redundant data. In one example, EDAC may cause the battery on the cellular device 102 to drain more quickly. In another example, EDAC may reduce the ability of the cellular device 102 to handle additional simultaneous tasks or applications. As such, the use of redundant data may be preferred when allowed by suitable conditions, such as sufficient signal-to-noise ratios and sufficient reliability of signal-to-noise ratios on the links used to transmit the redundant data.

Dealing with more subtle QoS conditions such as delay, latency, or jitter is generally more difficult. In one embodiment, when allowed by conditions such as signal-to-noise ratios, data may be switched from links with worse QoS conditions to links with better QoS conditions. Redundant data and EDAC may then be added as necessary, such that the best reasonable combination of techniques may be selected and employed over the multiple links. Furthermore, particular techniques such as adding redundant data and/or EDAC may be preferentially applied to those links which are best able to support the particular techniques due to, for example, the particular wireless conditions on those links. In some cases, data may be switched from a higher bandwidth link with high jitter to a lower bandwidth link. In other cases, data may also be switched from the higher bandwidth link to a high data loss link with less jitter to improve the overall jitter encountered. In such a case, redundant data may be added to another link to compensate for the data loss introduced. Similar approaches may sometimes be needed to handle delay and latency as well.

The cellular device 102 may divide (i.e., multiplex) the original data into data segments for transmission across the links 106a, 106b, 106c, 106d. In this way, the original data may be transmitted more efficiently and/or more robustly with respect to QoS by utilizing two or more of the links 106a, 106b, 106c, 106d instead of utilizing just one of the links 106a, 106b, 106c, 106d. Once received, the data segments may be combined (i.e., de-multiplexed) to form the original data. The data segments may be combined by the cellular towers 104a, 104b, 104c, 104d communicating in conjunction, by a central controller operatively coupled to the cellular towers 104a, 104b, 104c, 104d, or by the recipient device (not shown) receiving the data segments. The data segments may also be combined by a controller (not shown), such as a radio network controller and/or a base station controller. The controller may control and coordinate the various radio transceivers and other related equipment (often termed "based stations") utilized by each of the cellular towers 104a, 104b, 104c, 104d and by a network element (not shown). Examples of the network element include, but are not limited to, a gateway, an aggregator, and a de-multiplexer within the networks 218a, 218b, 218c, 218d. Further, the communications data or data segments may be interleaved prior to their transmission across the links 106a, 106b, 106c, 106d and de-interleaved when received. Interleaving generally refers to spreading data across the stream in a non-contiguous arrangement such that certain errors, such as burst errors, have reduced effect. De-interleaving generally refers to rearranging the interleaved data back to its original arrangement.

In one embodiment, a second quality rating is determined for each of the links 106a, 106b, 106c, 106d as data is transmitted across the links 106a, 106b, 106c, 106d. The second quality rating may be based on a signal-to-noise ratio associated with the links 106a, 106b, 106c, 106d as well as the consistency and volatility of the links 106a, 106b, 106c, 106d. In further embodiments, the second quality rating is based on any suitable QoS-related indicators associated with links 106a, 106b, 106c, 106d. As the cellular device 102 moves in the direction shown at 101 or if other QoS-related conditions change, the second quality rating may also change. QoS-related conditions can change due to changes in interference or noise levels, movement of other users, or changes in environmental conditions. The movement of other users may cause changes in co-interference levels. An example of an environmental condition is rain, which can affect signal attenuation. QoS-related conditions can also change due to signal attenuation, blocking, and/or reflections caused by the movement of vehicles on roadways and the like. If the second quality rating decreases, the quality factors may be readjusted to improve the second quality rating. The quality factors may be readjusted until the second quality rating reaches a satisfactory level. If, however, the quality factors have been readjusted a threshold number of times and the second quality rating still has not reached a satisfactory level, or if the ability to make the necessary adjustment has been exceeded such that the necessary adjustment is unachievable, then a second group of cellular towers, such as the cellular towers 104a, 104b, 104d, 104f, may be selected. As illustrated in FIG. 1B, the links 106a, 106b, 106d, 106f may be established in accordance with the second group of cellular towers 104a, 104b, 104d, 104f.

FIG. 1B is a high-level diagram illustrating an exemplary communications network 100b including the cellular device 102 and the plurality of cellular towers 104a, 104b, 104c, 104d, 104e, 104f after the movement of the cellular device 102 in the direction shown at 101. Compared to the communications network 100a, in the communications network 100b, the cellular device 102 has moved farther away from the first cellular tower 104a and the third cellular tower 104c and closer to the fifth cellular tower 104e and the sixth cellular tower 104f. In particular, the cellular device 102 has terminated the third link 106c to the third cellular tower 104c and has established the sixth link 106f to the sixth tower 104f. Accordingly, the communications network 100b includes the first link 106a to the first tower 104a, the second link 106b to the second tower 104b, the fourth link 106d to the fourth tower 104d, and the sixth link 106f to the sixth tower 104f.

As illustrated in FIG. 1B, the sixth link 106f may transmit more data than the second link 106b and the fourth link 106d as illustrated by the thicker arrow representing the sixth link 106f in comparison to the arrows representing the second link 106b and the fourth link 106d. The second link 106b and the fourth link 106d may transmit about the same amount of data as illustrated by the arrows representing the second link 106b and the fourth link 106d having about the same thickness. The second link 106b and the fourth link 106d may transmit more data than the first link 106a as illustrated by the thicker arrows representing the second link 106b and the fourth link 106d in comparison to the arrow representing the first link 106a. It should be noted that as the cellular device 102 moves farther away from the first cellular tower 104a, the first link 106a to the first tower 104a may be terminated, and a fifth link (not shown) to the fifth tower 104e may be established.

Figure 2:
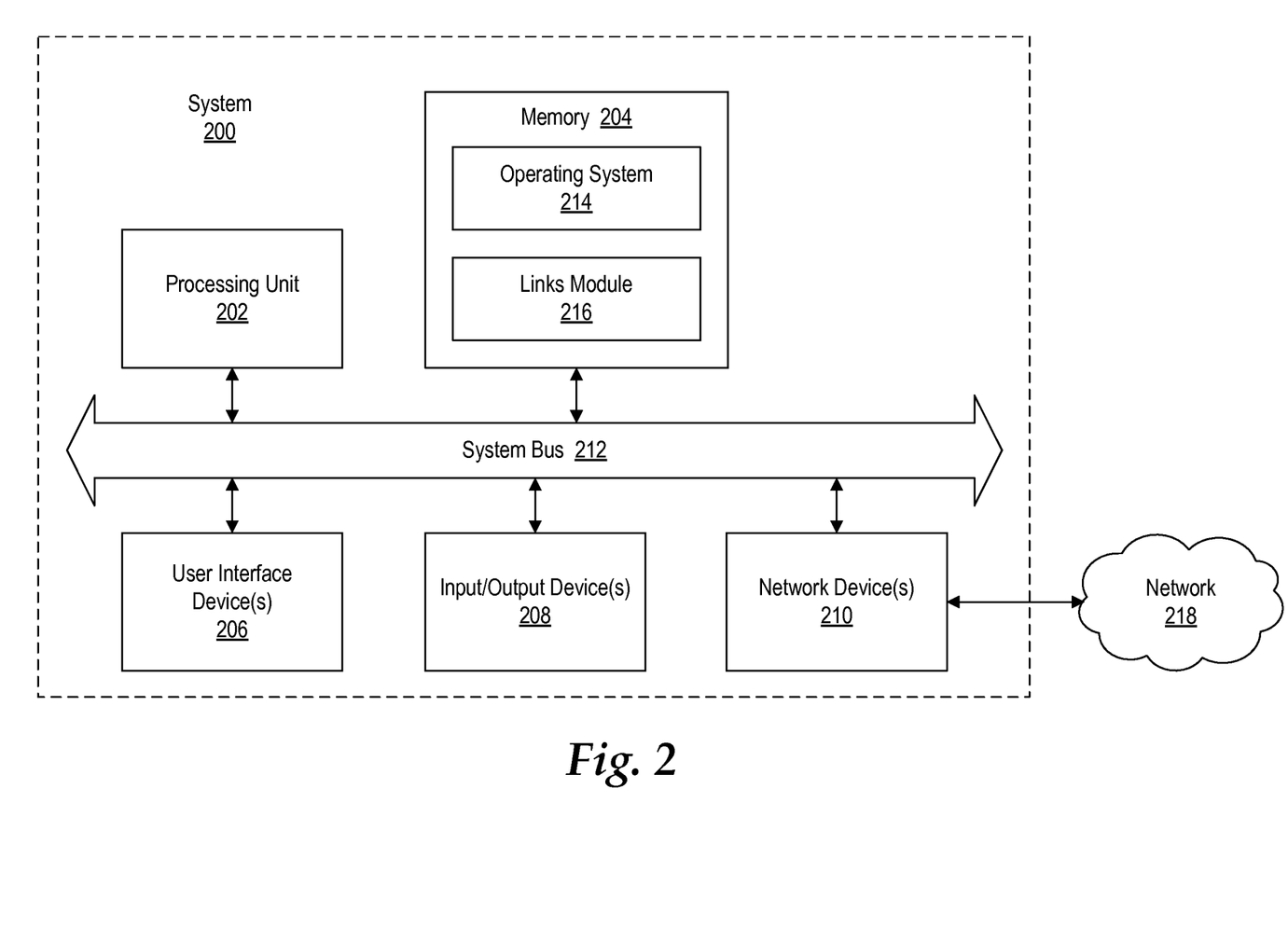
FIG. 2 is a block diagram illustrating a system configured to provide multiple communication paths, in accordance with exemplary embodiments.

FIG. 2 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 2 is a block diagram illustrating the system 200 configured to provide multiple communication paths, in accordance with exemplary embodiments. Examples of the system 200 may include the systems 200a, 200b, 200c, 200d, 200e, 200f of FIGS. 1A and 1B. Referring to FIG. 2, the system 200 includes a processing unit 202, a memory 204, one or more user interface devices 206, one or more input/output ("I/O") devices 208, and one or more network devices 210, each of which is operatively connected to a system bus 212. The bus 212 enables bi-directional communication between the processing unit 202, the memory 204, the user interface devices 206, the I/O devices 208, and the network devices 210. Examples of the system 200 include, but are not limited to, computers, servers, routers, gateways, controllers including radio network and/or base station controllers, personal digital assistants, cellular phones, or any suitable computing devices.

The processing unit 202 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 204 communicates with the processing unit 202 via the system bus 212. In one embodiment, the memory 204 is operatively connected to a memory controller (not shown) that enables communication with the processing unit 202 via the system bus 212. The memory 204 includes an operating system 214 and a links module 216, according to exemplary embodiments Examples of operating systems, such as the operating system 214, include, but are not limited to, WINDOWS and WINDOWS MOBILE operating systems from MICROSOFT CORPORATION, MAC OS operating system from APPLE CORPORATION, LINUX operating system, SYMBIAN OS from SYMBIAN SOFTWARE LIMITED, BREW from QUALCOMM INCORPORATED, and FREEBSD operating system. In one embodiment, the links module 216 is embodied in computer-readable media containing instructions that, when executed by the processing unit 202, performs a method for providing multiple communication paths, as described in greater detail below with respect to FIG. 3. According to further embodiments, the links module 216 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system 200.

The user interface devices 206 may include one or more devices with which a user accesses the system 200. The user interface devices 206 may include, but are not limited to, computers, servers, personal digital assistants, cellular phones, or any suitable computing devices. The I/O devices 208 enable a user to interface with the links module 216. In one embodiment, the I/O devices 208 are operatively connected to an I/O controller (not shown) that enables communication with the processing unit 202 via the system bus 212. The I/O devices 208 may include one or more input devices, such as, but not limited to, a keyboard, a mouse, or an electronic stylus. Further, the I/O devices 208 may include one or more output devices, such as, but not limited to, a display screen or a printer.

The network devices 210 enable the system 200 to communicate with other networks or remote systems via the network 218. Examples of the network devices 210 may include, but are not limited to, a modem, a radio frequency ("RF") or infrared ("IR") transceiver, a telephonic interface, a bridge, a router, or a network card. The network 218 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 218 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

In one embodiment, the system 200 is operatively coupled to each of the plurality of cellular towers 104a, 104b, 104c, 104d, 104e, 104f via the network 218 to provide multiple communication paths from the cellular device 102 to the cellular towers 104a, 104b, 104c, 104d, 104e, 104f. For example, as illustrated in FIGS. 1A and 1B, the plurality of systems 200a, 200b, 200c, 200d, 200e, 200f are operatively coupled to the cellular towers 104a, 104b, 104c, 104d, 104e, 104f via the networks 218a, 218b, 218c, 218d, 218e, 218f. In another embodiment, the system 200 is operatively coupled to two or more of the plurality cellular towers 104a, 104b, 104c, 104d, 104e, 104f. In this case, the system 200 may serve as a central controller for two or more of the cellular towers 104a, 104b, 104c, 104d, 104e, 104f. In yet another embodiment, the system 200 is included in the cellular device 102. In this case, the cellular device 102 may provide multiple communication paths to the cellular towers 104a, 104b, 104c, 104d, 104e, 104f without utilizing a central controller.

Figure 3:
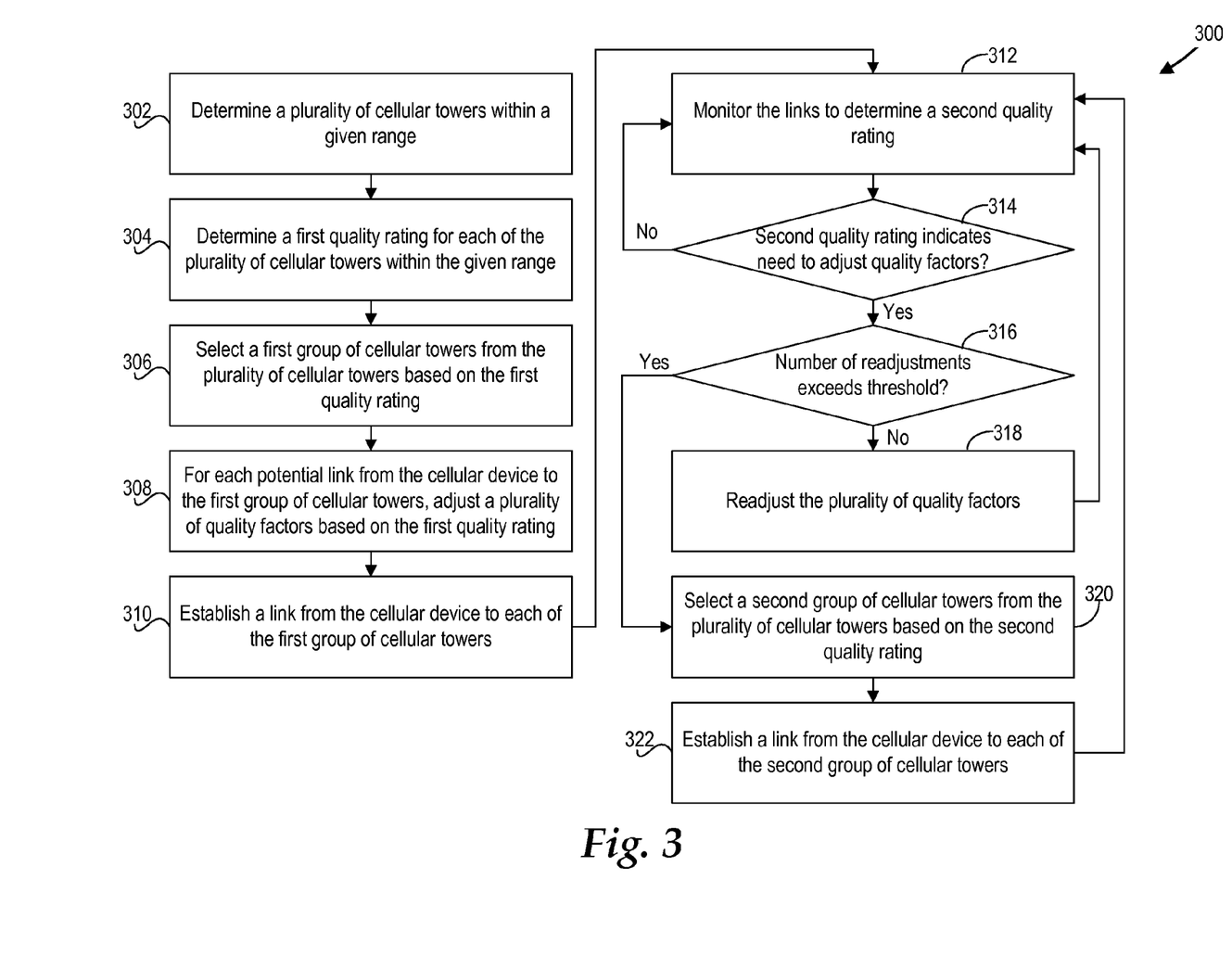
FIG. 3 is a flow diagram illustrating a method for providing multiple communication paths, in accordance with exemplary embodiments.

FIG. 3 is a flow diagram illustrating a method 300 for providing multiple communication paths, in accordance with exemplary embodiments. According to the method 300, the links module 216 determines (at 302) the cellular towers 104a, 104b, 104c, 104d, 104e, 104f that are within a given range of the cellular device 102. In one embodiment, the cellular towers 104a, 104b, 104c, 104d, 104e, 104f that are determined within the given range include those towers that successfully transmit a signal or data of a given signal strength or signal-to-noise ratio to the cellular device 102. In another embodiment, the cellular towers 104a, 104b, 104c, 104d, 104e, 104f that are determined within the given range include those towers that successfully complete a handshake communication process with the cellular device 102.

The links module 216 determines (at 304) a first quality rating for each of the cellular towers 104a, 104b, 104c, 104d, 104e, 104f within the given range. The first quality rating may be based on the signal-to-noise ratio and/or other QoS conditions for connections between the cellular device 102 and each of the cellular towers 104a, 104b, 104c, 104d, 104e, 104f, as well as the consistency and volatility of the connections. For example, a higher signal-to-noise ratio may yield a worse first quality rating, while a lower signal-to-noise ratio may yield a better first quality rating. Likewise, a less consistent and more volatile connection between the cellular device 102 and each of the cellular tower 104a, 104b, 104c, 104d, 104e, 104f may be yield a worse first quality rating, while a more consistent and less volatile connection may yield a better first quality rating.

The links module 216 selects (at 306) a first group of the cellular towers 104a, 104b, 104c, 104d from the cellular towers 104a, 104b, 104c, 104d, 104e, 104f based on the first quality rating. For example, the first group of the cellular towers 104a, 104b, 104c, 104d may be selected because they have the highest quality rating. For each potential link 106a, 106b, 106c, 106d from the cellular device 102 to the first group of cellular towers 104a, 104b, 104c, 104d, the links module 216 adjusts (at 308) a plurality of quality factors based on the quality rating. In one embodiment, the quality factors include a bandwidth factor, a redundancy factor, and an EDAC factor. A higher quality rating may result in a higher bandwidth factor, redundancy factor, and/or EDAC factor. The bandwidth factor refers to an amount of bandwidth available on each of the links 106a, 106b, 106c, 106d for transmitting original data, redundant data, and EDAC codes. The redundancy factor refers to the amount of redundant data transmitted across the links 106a, 106b, 106c, 106d. In one embodiment, the amount of redundant communications data is determined based on an amount of communications data to be duplicated (hereinafter referred to as $R_P$) and a number of copies of the duplicated communications data to be produced (hereinafter referred to as $R_N$). The EDAC factor refers to the type and/or amount of EDAC coding introduced into the links 106a, 106b, 106c, 106d along with the original data and the redundant data transmitted across the links 106a, 106b, 106c, 106d. The EDAC code may enable the automatic detection and correction of errors in the communications data when received. In particular, any errors in the original data may be corrected by replacing missing or corrupted data with the redundant data.

The links module 216 establishes (at 310) the plurality of links 106a, 106b, 106c, 106d from the cellular device 102 to the first group of cellular towers 104a, 104b, 104c, 104d. The links 106a, 106b, 106c, 106d may be utilized by the cellular device 102 to transmit and receive original data, redundant data, and EDAC codes. As previously noted, the amount of original data, redundant data, and EDAC codes for each of the links 106a, may be specified by the quality factors. The original data transmitted and received across the links 106a, 106b, 106c, 106d may be multiplexed (i.e., split) by the cellular device 102 into data segments. Each of the links 106a, 106b, 106c, 106d may be utilized to transmit one or more of the data segments. In this way, the extra communications flexibility and bandwidth available from having the links 106a, 106b, 106c, 106d may be utilized instead of relying on only one of the links 106a, 106b, 106c, 106d to transmit the entire original data. The receiver of the data segments may de-multiplex (i.e., combine) the data segments to form the original data. Further, the original data may be interleaved to reduce the effect of certain errors, such as burst errors.

As the links 106a, 106b, 106c, 106d are utilized to transmit and receive the original data, the redundant data, and the EDAC codes, the links module 216 monitors (at 312) the links 106a, 106b, 106c, 106d to determine a second quality rating. The second quality rating may also be based on signal-to-noise ratio in the links 106a, 106b, 106c, 106d as well as the consistency and volatility of the links 106a, 106b, 106c, 106d.

In further embodiments, the second quality rating may further include the amount of errors detected by the EDAC codes introduced into the links 106a, 106b, 106c, 106d. For example, a large amount of errors detected by the EDAC codes may indicate QoS issues with respect to the links 106a, 106b, 106c, 106d.

The links module 216 determines (at 314) whether the second quality rating indicates a need to change the quality factors. For example, the links module 216 may determine that the second quality rating needs to change the quality factors if the second quality rating exceeds or falls below a given threshold. In response to determining that the second quality rating does not indicate a need to change the quality factors, the links module 216 continues to monitor (at 312) the second quality rating associated with the links 106a, 106b, 106c, 106d. In response to determining that the second quality rating does indicate a need to change the quality factors, the links module 216 determines (at 316) whether the number of readjustments has exceeded a readjustments threshold. In response to determining that the number of readjustments has not exceeded the readjustments threshold, the links module 216 readjusts (at 318) the plurality of quality factors based on the second quality rating. In one embodiment, the links module 216 readjusts the bandwidth factor, the redundancy factor, and/or the EDAC factor. Until the readjustments threshold is exceeded, the quality factors may be readjusted until a satisfactory second quality rating is achieved. The values of the quality factors may be limited to a given maximum value and a given minimum value, thereby limiting the extent of the readjustments.

In response to determining that the number of readjustments has exceeded the readjustments threshold, the links module 216 selects (at 320) a second group of the cellular towers 104a, 104b, 104d, 104f, and establishes (at 322) the plurality of links 106a, 106b, 106d, 106f between the cellular device 102 and the second group of cellular towers 104a, 104b, 104d, 104f. In one embodiment, the links module 216 determines the plurality of the cellular towers 104a, 104b, 104c, 104d, 104f within the given range and determines the first quality rating for the plurality of the cellular towers 104a, 104b, 104c, 104d, 104e, 104f. The links module 216 may select the second group of the cellular towers 104a, 104b, 104d, 104f based on the first quality rating. As previously described, the first quality rating may be based on the signal-to-noise ratio for connections between the cellular device 102 and each of the cellular towers 104a, 104b, 104c, 104d, 104e, 104f, as well as the consistency and volatility of the connections. The links module 216 continues to monitor (at 312) the links 106a, 106b, 106d, 106f to determine the second quality rating.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for providing multiple communication paths, comprising:

determining a plurality of cellular towers within a given range from a cellular device by analyzing signal strength and signal-to-noise ratio between the plurality of cellular towers and the cellular device;

determining a first quality rating for each of the plurality of cellular towers based on the signal-to-noise ratio and volatility of a connection between the cellular device and each of the plurality of cellular towers;

identifying a first group of cellular towers from the plurality of cellular towers based on the first quality rating, the first group of cellular towers comprising a first subset of the plurality of cellular towers;

upon identifying the first group of cellular towers, increasing quality factors by increasing an amount of bandwidth, a redundancy factor indicating an amount of redundancy, and an error detection and correction factor indicating an amount of error detection and correction codes associated with a first potential communication path between the cellular device and at least one of the first group of cellular towers based on the first quality rating, and decreasing the quality factors by decreasing the amount of bandwidth, the redundancy factor indicating the amount of redundancy, and the error detection and correction factor indicating the amount of error detection and correction codes associated with a second potential communication path between the cellular device and at least another one of the first group of cellular towers based on the first quality rating; and upon increasing and decreasing the quality factors, establishing a first plurality of communication paths between the cellular device and the first group of cellular towers including establishing the first potential communication path and the second potential communication path, each of the first plurality of communication paths corresponding to one of the cellular towers in the first group.

2. The method of claim 1, further comprising:

upon establishing the first plurality of communication paths, monitoring each of the first plurality of communication paths to determine a second quality rating as data is transmitted across the first plurality of communication paths; and readjusting the amount of bandwidth, the redundancy factor indicating the amount of redundancy, and the error detection and correction factor indicating the amount of error detection and correction codes for at least one of the first plurality of communication paths based on the second quality rating.

3. The method of claim 1, further comprising:

upon establishing the first plurality of communication paths, monitoring a second quality rating for each of the first plurality of communication paths as data is transmitted across the first plurality of communication paths;

determining whether a number of potential readjustments to the amount of bandwidth, the redundancy factor indicating the amount of redundancy, and the error detection and correction factor indicating the amount of error detection and correction codes has exceeded a readjustments threshold; and in response to determining that the number of potential readjustments has exceeded the readjustments threshold, identifying a second group of cellular towers from the plurality of cellular towers, and establishing a second plurality of communication paths between the cellular device and the second group, each of the second plurality of communication paths corresponding to a cellular tower of the second group.

4. The method of claim 1, further comprising:

multiplexing data into data segments prior to transmitting the data segments across the first plurality of communication paths; and de-multiplexing the data segments after receiving the data transmitted across the first plurality of communications paths.

5. The method of claim 1, further comprising:

interleaving data to generate a non-contiguous data stream prior to transmitting the non-contiguous data stream across the first plurality of communication paths.

6. A system for providing multiple communication paths, comprising:

a memory for storing a program containing code for providing multiple communication paths;

a processor functionally coupled to the memory, the processor being responsive to computer-executable instructions contained in the program and operative to:

determine a plurality of cellular towers within a given range from a cellular device by analyzing signal strength and signal-to-noise ratio between the plurality of cellular towers and the cellular device, determine a first quality rating for each of the plurality of cellular towers based on the signal-to-noise ratio and volatility of a connection between the cellular device and each of the plurality of cellular towers, identify a first group of cellular towers from the plurality of cellular towers based on the first quality rating, the first group of cellular towers comprising a first subset of the plurality of cellular towers, upon identifying the first group of cellular towers, (a) increase quality factors by increasing an amount of bandwidth, a redundancy factor indicating an amount of redundancy, and an error detection and correction factor indicating an amount of error detection and correction codes associated with a first potential communication path between the cellular device and at least one of the first group of cellular towers based on the first quality rating, and b) decrease the quality factors by decreasing the amount of bandwidth, a redundancy factor indicating the amount of redundancy, and the error detection and correction factor indicating the amount of error detection and correction codes associated with a second potential communication path between the cellular device and at least one of the first group of cellular towers based on the first quality rating, and upon increasing and decreasing the quality factors, establish a first plurality of communication paths between the cellular device and the first group of cellular towers including establishing the first potential communication path and the second potential communication path, each of the first plurality of communication paths corresponding to one of the cellular towers in the first group.

7. The system of claim 6, wherein the processor is further operative to:

upon establishing the first plurality of communication paths, monitor each of the first plurality of communication paths to determine a second quality rating as data is transmitted across the first plurality of communication paths, and readjust the amount of bandwidth, the redundancy factor indicating the amount of redundancy, and the error detection and correction factor indicating the amount of error detection and correction codes for at least one of the first plurality of communication paths based on the second quality rating.

8. The system of claim 6, wherein the processor is further operative to:
  upon establishing the first plurality of communication paths, monitor a second quality rating for each of the first plurality of communication paths as data is transmitted across the first plurality of communication paths,
  determine whether a number of potential readjustments to the amount of bandwidth, the redundancy factor indicating the amount of redundancy, and the error detection and correction factor indicating the amount of error detection and correction codes has exceeded a readjustments threshold, and
  in response to determining that the number of potential readjustments has exceeded the readjustments threshold,
    identify a second group of cellular towers from the plurality of cellular towers, and
    establish a second plurality of communication paths between the cellular device and the second group, each of the second plurality of communication paths corresponding to a cellular tower of the second group.

9. The system of claim 6, wherein the processor is further operative to:
  multiplex data into data segments prior to transmitting the data segments across the first plurality of communication paths; and
  de-multiplex the data segments after receiving the data transmitted across the first plurality of communications paths.

10. A non-transitory computer-readable medium having instructions stored thereon for execution by a processor to provide a method for providing multiple communication paths, the method comprising: determining a plurality of cellular towers within a given range from a cellular device by analyzing signal strength and signal-to-noise ratio between the plurality of cellular towers and the cellular device; determining a first quality rating for each of the plurality of cellular towers based on the signal-to-noise ratio and volatility of a connection between the cellular device and each of the plurality of cellular towers; identifying a first group of cellular towers from the plurality of cellular towers based on the first quality rating, the first group of cellular towers comprising a first subset of the plurality of cellular towers; upon identifying the first group of cellular towers, increasing quality factors by increasing an amount of bandwidth, a redundancy factor indicating an amount of redundancy, and an error detection and correction factor indicating an amount of error detection and correction codes associated with a first potential communication path between the cellular device and at least one of the first group of cellular towers based on the first quality rating; decreasing the quality by decreasing the amount of bandwidth, a redundancy factor indicating the amount of redundancy, and the error detection and correction factor indicating the amount of error detection and correction codes associated with second potential communication path between the cellular device and at least one of the first group of cellular towers based on the first quality rating; and upon increasing and decreasing the quality factors, establishing a first plurality of communication paths between the cellular device and the first group of cellular towers including establishing the first potential communication path and the second potential communication path, each of the first plurality of communication paths corresponding to one of the cellular towers in the first group.

11. The non-transitory computer-readable medium of claim 10, the method further comprising: upon establishing the first plurality of communication paths, monitoring each of the first plurality of communication paths to determine a second quality rating as data is transmitted across the first plurality of communication paths; and readjusting the amount of bandwidth, the redundancy factor indicating the amount of redundancy, and the error detection and correction factor indicating the amount of error detection and correction codes for at least one of the first plurality of communication paths based on the second quality rating.

12. The non-transitory computer-readable medium of claim 10 the method further comprising: upon establishing the first plurality of communication paths, monitoring a second quality rating for each of the first plurality of communication paths as data is transmitted across the first plurality of communication paths; determining whether a number of potential readjustments to the amount of bandwidth, the redundancy factor indicating the amount of redundancy, and the error detection and correction factor indicating the amount of error detection and correction codes has exceeded a readjustments threshold; and in response to determining that the number of potential readjustments has exceeded the readjustments threshold, identifying a second group of cellular towers from the plurality of cellular towers, and establishing a second plurality of communication paths between the cellular device and the second group, each of the second plurality of communication paths corresponding to a cellular tower of the second group.

13. The non-transitory computer-readable medium of claim 10, the method further comprising: multiplexing data into data segments prior to transmitting the data segments across the first plurality of communication paths; and de-multiplexing the data segments after receiving the data transmitted across the first plurality of communications paths.

14. The non-transitory computer-readable medium of claim 10, the method further comprising: interleaving data to generate a non-contiguous data stream prior to transmitting the non\- contiguous data stream across the first plurality of communication paths.

* * * * *